United States Patent [19]
Marquez

[11] 3,793,992
[45] Feb. 26, 1974

[54] ACCESSORY WATER HEATER FOR A GAS-FIRED WATER HEATER

[76] Inventor: Fidencio G. Marquez, 619 Ocean Blvd., Coronado, Calif. 92118

[22] Filed: July 26, 1972

[21] Appl. No.: 275,197

[52] U.S. Cl. .............................. 122/20 B, 122/156
[51] Int. Cl. .............................................. F22d 1/24
[58] Field of Search... 122/20 B, 125, 156, 163, 164

[56] References Cited
UNITED STATES PATENTS

| | | | |
|---|---|---|---|
| 2,653,583 | 9/1953 | Granger | 122/156 X |
| 2,020,686 | 11/1935 | Kaiser | 122/20 |
| 2,080,229 | 5/1937 | Ray | 122/20 |
| 1,107,534 | 8/1914 | Lorekin | 122/20 X |
| 1,990,056 | 2/1935 | Van Daam | 122/20 |
| 2,481,480 | 9/1949 | Main | 122/20 X |

Primary Examiner—Kenneth W. Sprague
Attorney, Agent, or Firm—Roy L. Knox

[57] ABSTRACT

An attachment or accessory water heater for mounting on the exhaust gas flue of a gas-fired water heater such as those sold for domestic use. There is usually a considerable space above domestic water heaters as ordinarily installed and the exhaust gas flue of such heaters ordinarily traverses this space. It is proposed by this invention to use much of the heat otherwise dissipated through the exhaust flue to preheat, or superheat, the water. The accessory heater is essentially a heat exchanger conduit of considerable capacity capable of encircling the exhaust flue and having means for connection in series in the piping of the main heater, the conduit having thermal insulation to inhibit loss of heat to the atmosphere.

3 Claims, 6 Drawing Figures

PATENTED FEB 26 1974  3,793,992

3,793,992

ACCESSORY WATER HEATER FOR A GAS-FIRED WATER HEATER

BACKGROUND OF THE INVENTION

In domestic water heaters, a very large percentage use gas in preference to electricity as a source of heat and the majority of these gas-fired water heaters have an exhaust gas flue extending from the top and there is a very significant loss of heat from this flue. Prior art devices for attachment to or incorporation in ranges have been developed and used for many years to supply heated water, usually for space heating purposes at some distance from the range, and some devices for attachment to flues have been used as heat exchangers. There is a need, however, for an accessory type water heater which can be attached to the flue of a main water heater to improve the efficiency by avoiding heat loss and to increase the over-all capacity of the system.

SUMMARY OF THE INVENTION

As claimed, the immediately above mentioned need is met by a conduit, which may be in the form of a tank, a coil, or multiple tubes, dimensioned and configured to enclose a major portion of the exhaust flue on a gas-fired water heater. According to this invention the item is provided as an attachment or accessory for a conventional gas-fired domestic water heater. The type of insulation is not critical but it is always applied exteriorly to the conduit. Direct series connection of the conduit is made in the intake or outlet piping of the main water heater.

DETAILED DESCRIPTION OF A PREFERRED EMBODIMENT

Figure 1:
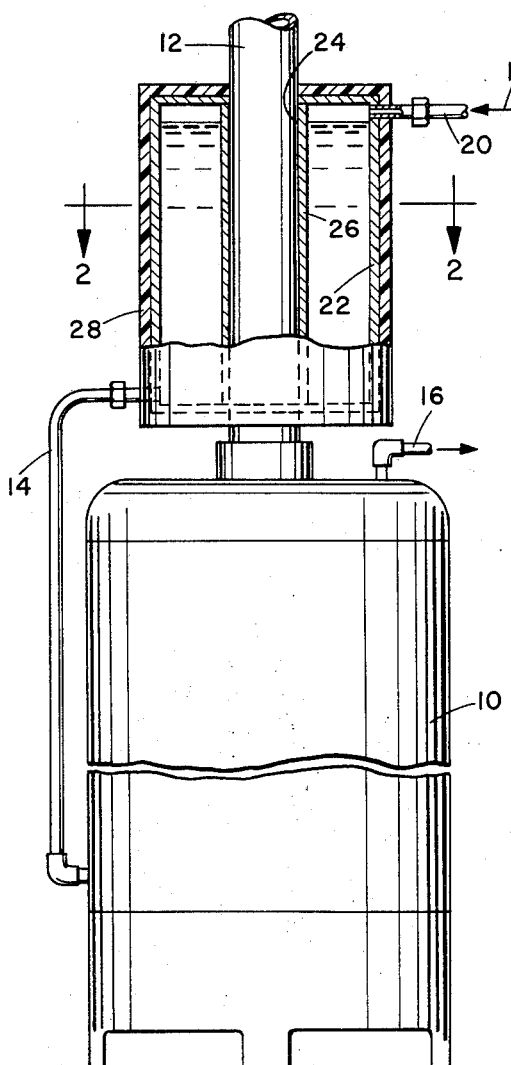
FIG. 1 is a side elevation view, partially cut away, of a gas-fired water heater with the attachment installed.
Figure 2:
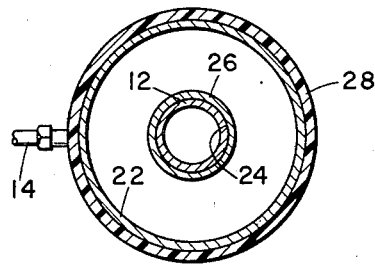
FIG. 2 is a sectional view taken on line 2—2 of FIG. 1.

Referring now to the drawing representing a preferred means for carrying this invention into practice, a conventional domestic water heater is indicated at 10. Although it seems unnecessary to illustrate the gas-fired heating unit as such it will be understood that this invention is related only to such water heaters since the invention is essentially a water heater for use on the exhaust flue 12 fragmentarily illustrated in FIGS. 1, 3 and 5, as well as shown in section in the other figures. It is important to note that this invention is conceived rather strictly as an attachment or accessory and as combined or adapted to be combined directly with the exhaust flue 12 as well as the inlet piping 14 or outlet piping 16 of the main water heater 10, the showing in FIG. 1 illustrating the use of the attachment as a pre-heater connected in series in the inlet piping 14. An arrow 18 indicates the flow of water through as inlet pipe 20 into a heat exchanger conduit, in this case a tank 22, other forms of conduits being illustrated in FIGS. 3–6.

The tank-like heat exchanger conduit 22 has the advantage of considerable capacity so that the overall capacity of the water heater system is increased and an axially disposed control recticylindrical opening 24 is defined by a pipe-like portion 26 to receive the flue 12, preferably reasonably snugly so that good heat transference will occur between the flue and portion 26 and of course to the water in the tank-like heat exchanger conduit. Thermal Insulation of any suitable character is applied externally as indicated at 28 to inhibit undue loss of heat to the atmosphere.

Figure 3:
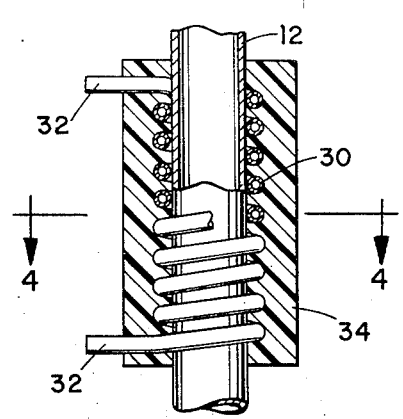
FIG. 3 is a side elevation view, partially in section of an alternative form of attachment.
Figure 4:
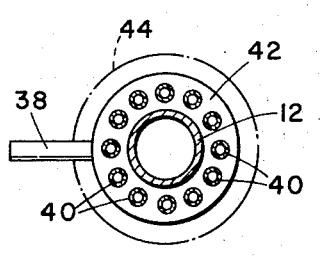
FIG. 4 is a sectional view taken on line 4—4 of FIG. 3.

In FIGS. 3 and 4 the heat exchanger conduit is illustrated as a helical coil 30 wound around the flue 12 with ends 32 connectable with the inlet 14 or outlet 16 of the main water heater. Thermal insulation of any suitable character encases the coil 30 as indicated at 34.

Figure 5:
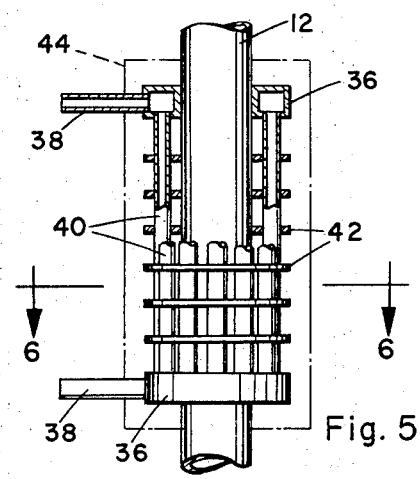
FIG. 5 is a side elevation view, partially in section of a further alternative form of attachment.
Figure 6:
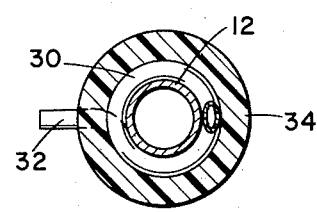
FIG. 6 is a sectional view taken on a line 6—6 of FIG. 5.

The heat exchanger conduit illustrated in FIGS. 5 and 6 has headers 36, connected directly with inlet-outlet pipes 38, for series connection in the inlet 14 or outlet 16 of the main water heater. Between the headers 36 are a plurality of tubes 40 which will ordinarily be vertical and which support heat exchanger fins 42, the latter being preferably integrated with the tubes 40 for better heat conduction to the tubes and also in close contact with the flue 12 for initial heat absorption. Of course the pipes 40 receive considerable heat directly from the pipes 40 and the water in the headers 36 and pipes 40 is heated as hereinfore mentioned. Thermal insulation 44 is applied externally as in the other forms of this invention.

The inside pipe of the accessory water heater may be also used as part of the flue itself to be coupled in series with an existing water heater flue usually immediately above the main water heater.

I claim:

1. An accessory water heater for use with a gas fired water heater having an exhaust gas flue and water inlet and outlet piping;

said accessory water heater being capable of being operatively mounted on and supported by said gas flue independently of and separate from said gas fired water heater;

said accessory water heater comprising an elongated tube structure, wherein the tube diameter is less than that of said gas flue, for connection in series with said piping and having a major portion thereof encircling and in thermal conductive relation with said gas flue, and thermal insulation material encasing said tube structure on said gas flue to inhibit loss of heat to the atmosphere.

2. Structure according to claim 1 wherein said elongated tube structure is a single tube wound spirally around said exhaust gas flue; and thermal insulation material embedding and encasing said spirally wound tube.

3. Structure according to claim 1 wherein said elongated tube structure comprises a plurality of parallel tubes of equal length and headers supporting and communicating with the ends of the tubes, the headers being connected to said piping.

* * * * *